(12) United States Patent
Stergiou (10) Patent No.: US 8,983,893 B2
(45) Date of Patent: Mar. 17, 2015

(54) MODELING DYNAMIC GRAPHS WITH BINARY DECISION DIAGRAMS

(75) Inventor: Stergios Stergiou, East Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 148 days.

(21) Appl. No.: 13/569,618

(22) Filed: Aug. 8, 2012

(65) Prior Publication Data

US 2014/0046886 A1    Feb. 13, 2014

(51) Int. Cl.
*G06F 15/00* (2006.01)
*G06F 15/18* (2006.01)

(52) U.S. Cl.
USPC .......................................................... 706/62

(58) Field of Classification Search
CPC .................................. G06F 15/00; G06F 15/18
USPC ............................................................ 706/62
See application file for complete search history.

(56) References Cited

U.S. PATENT DOCUMENTS 6,392,653 B1 *    5/2002    Malandain et al. ............ 345/501

OTHER PUBLICATIONS

'Disjunctive Transition Relation Decompositions for Multithreaded Image Computation': Stergiou, 2009,14th Asia and South Pacific Design Automation Conference (ASP-DAC 2009).*

* cited by examiner

*Primary Examiner* — Kakali Chaki
*Assistant Examiner* — Peter Coughlan
(74) *Attorney, Agent, or Firm* — Baker Botts L.L.P.

(57) ABSTRACT

In one embodiment, a dynamic graph having a plurality of nodes is modeled with a Binary Decision Diagram (BDD). Each pair of nodes in the dynamic graph is modeled using a characteristic function, $g(\vec{t}; \vec{a}; \vec{b})$, where: $\vec{t}$ denotes a time; $\vec{a}$ denotes a first node identifier; $\vec{b}$ denotes a second node identifier; and g evaluates to 1 (or TRUE) if and only if an edge exists and connects nodes $\vec{a}$ and $\vec{b}$ at time $\vec{t}$. The BDD is a combination of all the characteristic functions corresponding to all unique pairs of nodes in the dynamic graph.

18 Claims, 4 Drawing Sheets

MODELING DYNAMIC GRAPHS WITH BINARY DECISION DIAGRAMS

TECHNICAL FIELD

This disclosure generally relates to binary decision diagrams (BDDs).

BACKGROUND

A Binary Decision Diagram (BDD) is a data structure that may be used to represent a Boolean function. A Reduced Ordered Binary Decision Diagram (ROBDD) is an optimized BDD that has no redundant nodes and isomorphic sub-graphs and that the variables appear in the same order along each path from root to a terminal node. It is possible to store BDDs in memory efficiently, such as in a compressed form, so that a large amount of data may be stored using a relatively small amount of memory or storage space. In addition, information may be extracted from BDDs quickly, such as with a relatively few number of binary operations.

SUMMARY

In particular embodiments, a dynamic graph having a plurality of nodes is modeled with a Binary Decision Diagram (BDD). Each pair of nodes in the dynamic graph is modeled using a characteristic function, $g(\vec{t}; \vec{a}; \vec{b})$, where: $\vec{t}$ denotes a time; $\vec{a}$ denotes a first node identifier; $\vec{b}$ denotes a second node identifier; and g evaluates to 1 (or TRUE) if and only if an edge exists and connects nodes $\vec{a}$ and $\vec{b}$ at time $\vec{t}$. The BDD is a combination of all the characteristic functions corresponding to all unique pairs of nodes in the dynamic graph.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF EXAMPLE EMBODIMENTS

A Binary Decision Diagram (BDD) is a data structure that may be used to represent a Boolean function. Given a Boolean function with n variables, $f(x_1, \ldots, x_n)$, the BDD representing this Boolean function also has n variables, corresponding to the n variables of the Boolean function. A BDD may be graphically represented as a rooted, directed, and acyclic graph having one or more internal decision nodes and two terminal nodes. The two terminal nodes are a FALSE or 0 terminal node and a TRUE or 1 terminal node. Each decision node (i.e., non-terminal node) corresponds to and represents a specific variable of the Boolean function and has two edges, a FALSE or 0 edge and a TRUE or 1 edge. Each edge may be connected to another decision node or to one of the terminal nodes. Each path in the graph may by formed by one or more decision nodes and their associated edges, and eventually leads to either the 0 terminal node or the 1 terminal node. The decision nodes that form a particular path each represent a different variable of the Boolean function. That is, along a single path, no two decision nodes represent the same variable of the Boolean function. A path that leads to the 0 terminal node indicates that the Boolean function evaluates to FALSE for the values assigned to the variables represented by the decision nodes on that path; and a path that leads to the 1 terminal node indicates that the Boolean function evaluates to TRUE for the values assigned to the variables represented by the decision nodes on the path.

A BDD whose redundant decision nodes and isomorphic sub-graphs have been removed and whose decision nodes appear in the same order from the root to the terminal nodes along all the paths in the BDD is referred to as a Reduced Ordered Binary Decision Diagram (ROBDD). A ROBDD has two important properties. First, the ROBDD is ordered. That is, there is a fixed order $\pi\{1, \ldots, n\} \to \{x_1, \ldots, x_n\}$ such that for any non-terminal node v, $\text{index}(\text{low}(v)) = \pi(k)$ with $k > \pi^{-1}(\text{index}(v))$ and $\text{index}(\text{high}(v)) = \pi(q)$ with $q > \pi^{-1}(\text{index}(v))$ hold if low(v) and high(v) are also non-terminal nodes. Second, the ROBDD is reduced. That is, there exists no non-terminal node $v \in V$ with low(v)=high(v) and there are no two non-terminal nodes v and v' such that the sub-BDDs rooted by v and v' are isomorphic.

Figure 1:
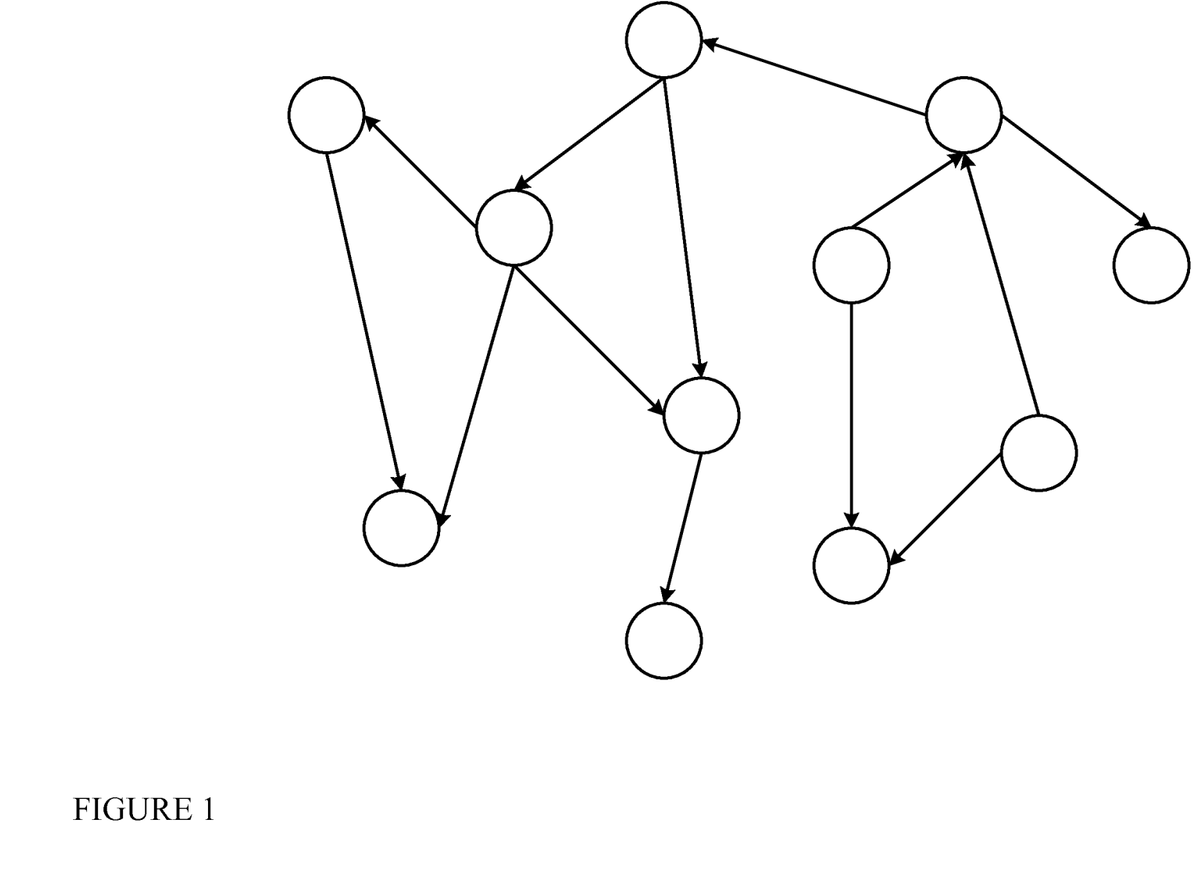
FIG. 1 illustrates an example graph having a number of nodes and edges.

BDDs may be used to model many types of data. In particular embodiments, a dynamic graph may be modeled with a BDD. A dynamic graph is similar to a directed graph, or digraph, in that it may include any number of nodes and edges, with each edge connecting two specific nodes, an example of which is illustrated in FIG. 1. However, a dynamic graph differs from the traditional directed graph in that its edges may be "active" within specific time periods.

Figure 2A:
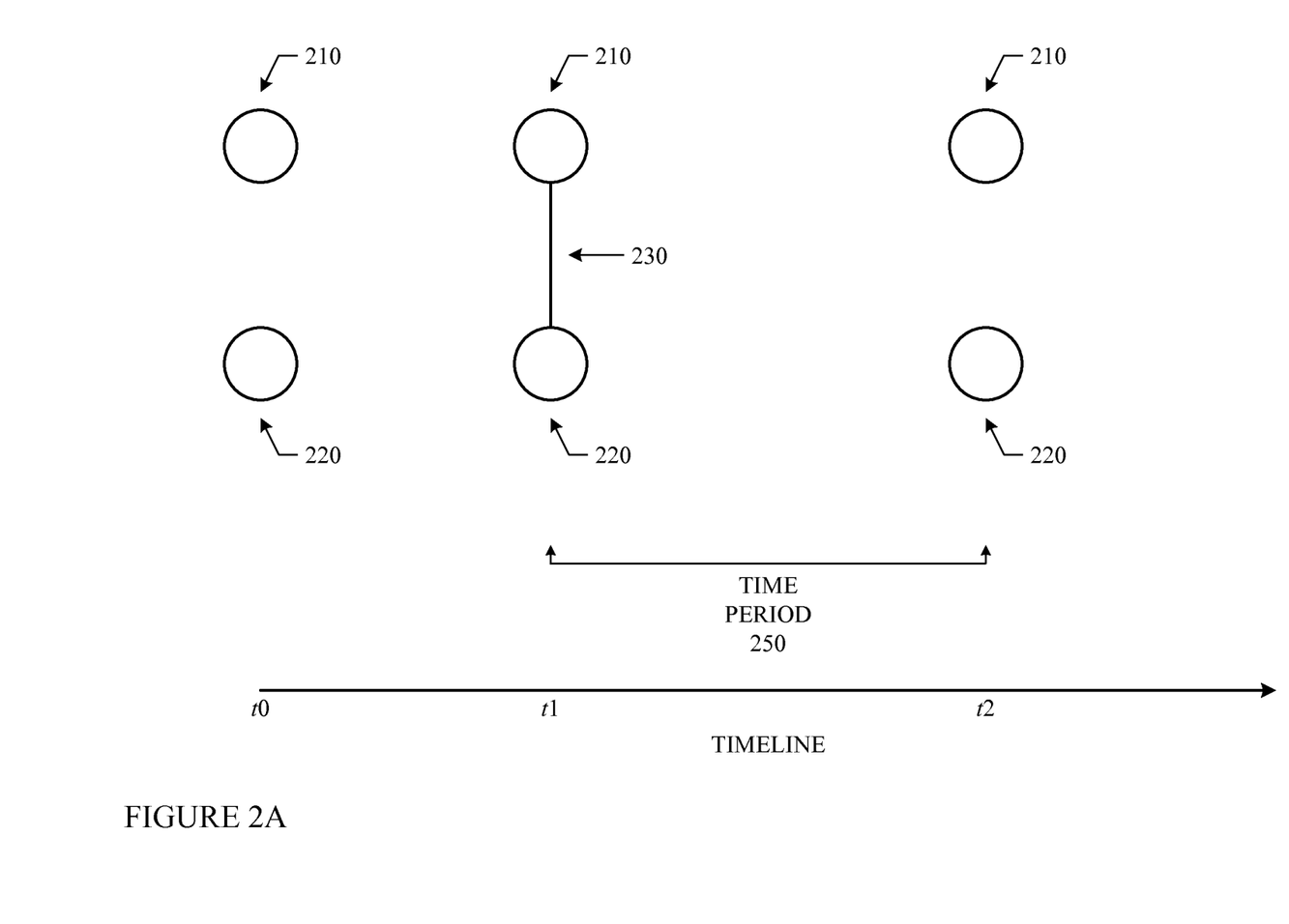
FIG. 2A illustrates an example pair of nodes connected by an edge within a specific period of time.

As an example, in FIG. 2A, before time t1 along the timeline, there is no edge connecting nodes 210 and 220. At time t1, an edge 230 comes into existence and connects nodes 210 and 220. At time t2, edge 230 goes away and there again is no edge connecting nodes 210 and 220. Thus, in this case, edge 230 exists or is active only during a specific time period 250, specifically between time t1 and t2 alone the timeline.

Figure 2B:
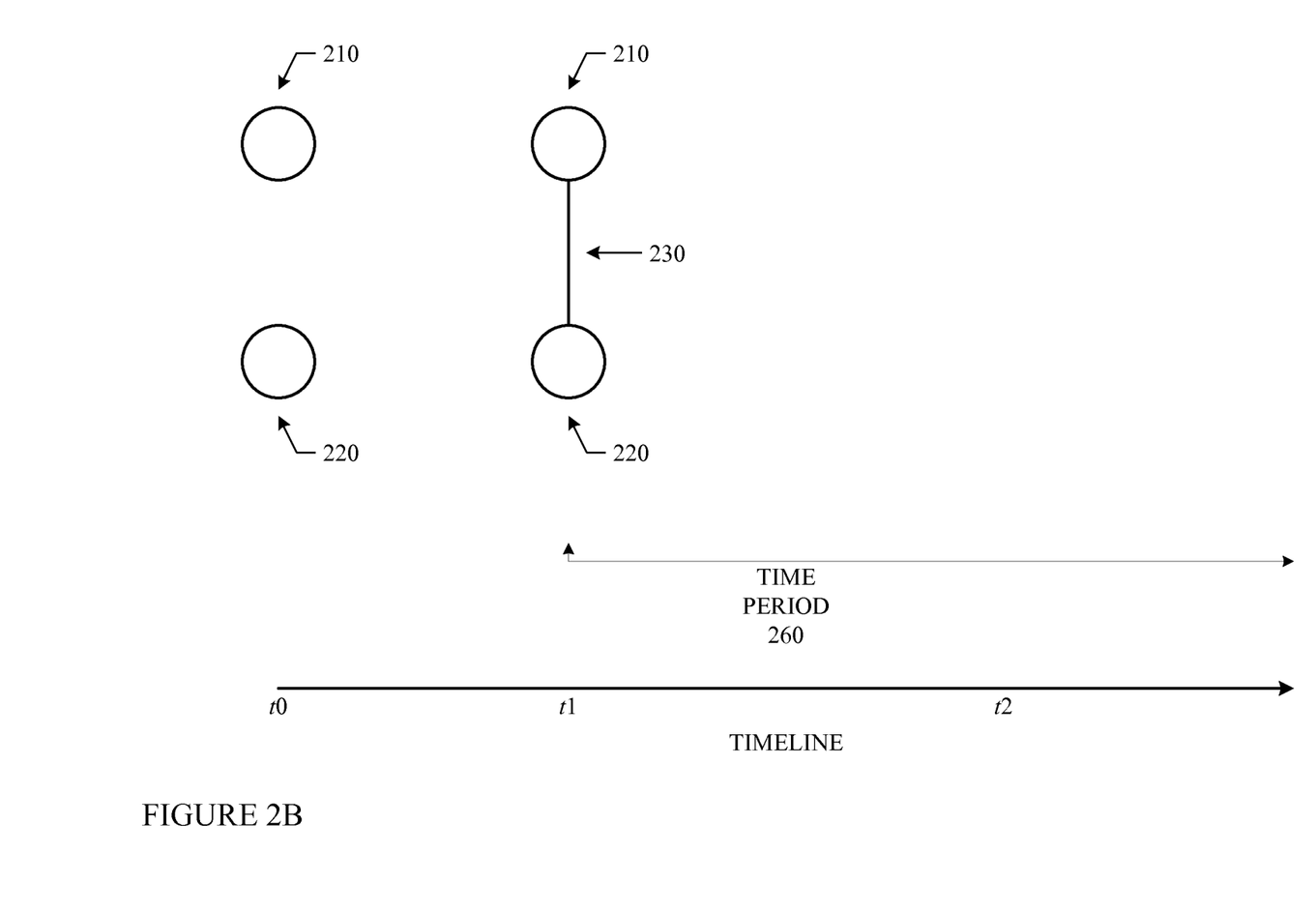
FIG. 2B illustrates an example pair of nodes connected by an edge starting at a specific time.

As anther example, in FIG. 2B, again, before time t1 along the timeline, there is no edge connecting nodes 210 and 220. At time t1, an edge 230 comes into existence and connects nodes 210 and 220. However, edge 230 does not go away and continues to exist indefinitely. Thus, in this case, edge 230 exists or is active during time period 260, specifically from time t1 onward.

Dynamic graphs may be used to represent various types of data or information. For example, a social network graph, such as the one associated with Facebook owned by Facebook Inc., may be represented as a dynamic graph. In this case, each node in the graph may represent a user of the social network. An edge connecting two nodes may represent a social connection between the two corresponding users. A social connection between two users may be active or in existence during a specific time period. As an example, two users may "friend" each other through the social network at a specific time. Before that specific time, there is no social connection between these two users. However, after that time, there is a social connection between these two users. Thus, in the social network graph, there is an edge connecting the two corresponding nodes only after the time when the two users "friend" each other. As another example, two users who have a social connection may decide to "unfriend" each other at a specific time. Before that specific time, there is a social connection between these two users. However, after that time, there is no longer a social connection between these two users. Thus, in the social network graph, there is no longer an edge connecting the two corresponding nodes after the time when the two users "unfriend" each other. Consequently, in the social network graph, each edge may be active or in existence after a specific time or between a specific time period.

Often, a dynamic graph, such as a social network graph, may grow very large in size, with many nodes and edges. Storing such a large graph, especially in uncompressed form, may require a large amount of memory or storage space (e.g., in the range of terabytes). In addition, it may require many operations (e.g., to traverse the graph), and thus it is expensive, to extract specific information from such a large graph.

In particular embodiments, a dynamic graph may be modeled with a BDD. A BDD may be stored in compressed form, and thus it requires a relatively small amount of memory or storage space to store a BDD. In addition, specific information may be extracted from a BDD with a relatively few binary operations. Consequently, when a dynamic graph is modeled with a BDD, the graph may be stored using a relatively small amount of memory or storage space, and it is relatively easy and fast to extract specific information from the graph.

A characteristic function (CF) may be expressed in the form of a Boolean function. In particular embodiments, a characteristic function of a set S may be defined as:

$$f_s(\vec{x}) = 1 \text{ iff } [\vec{x}] \in S, x_i \in \{0,1\}, \tag{1}$$

In EQUATION (1), S denotes a set of numbers, and more specifically, a set of integers denotes the variables of the characteristic function $f$. The "iff" operator means if and only if. Note that $f$ may have any number of variables. Each variable $x_i$ may have a value of either 0 or 1. For example, a characteristic function with three variables, $x_1$, $x_2$, and $x_3$, of a set S={1, 2, 6} may have the following input and output values

| $x_1$ | $x_2$ | $x_3$ | f |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 0 |
| 1 | 0 | 1 | 0 |
| 1 | 1 | 0 | 1 |
| 1 | 1 | 1 | 0 |

In this case, the output value off is $f$ (or TRUE) only when the input value of the three variables $x_1$, $x_2$, and $x_3$ is 1 (i.e., "0, 0, 1" in binary form), 2 (i.e., "0, 1, 0" in binary form), or 6 (i.e., "1, 1, 0" in binary form). For all other input values of $x_1$, $x_2$, and $x_3$, the output value of $f$ is 0 (or FALSE).

In particular embodiments, in a dynamic graph, each node may have a unique Node Identifier (ID). A Node ID may be an integer, which may be expressed in binary form. For example, a Node ID of value 10 may be expressed as "1010" in binary form, and a Node ID of value 22 may be expressed as "10110" in binary form.

In particular embodiments, a timeline may be divided into discreet time units (e.g., second, minute, hour, day, month, year, etc.). A specific time along the timeline may be similarly expressed in binary form. For example, the 15th time unit (e.g., the 15th day along the timeline) may be expressed in binary form as "1111".

In particular embodiments, given a dynamic graph, for each pair of nodes in the graph, a characteristic function describing the edge connecting the two nodes may be defined as:

$$g(\vec{t};\vec{a};\vec{b}) = 1_{if}[\vec{a}] \to [\vec{b}] \text{ is live at } \vec{t}. \tag{2}$$

In EQUATION (2), $\vec{a}$ denotes the Node ID of one of the two nodes connected by the edge, and $\vec{b}$ denotes the Node ID of the other one of the two nodes connected by the edge. $\vec{t}$ denotes a specific time along the timeline. The characteristic function g evaluates to 1 (or TRUE) if and only if the edge connecting the two nodes $\vec{a}$ and $\vec{b}$ is live (i.e., in existence) at time $\vec{t}$. Otherwise, the characteristic function g evaluates to 0 (or FALSE). In particular embodiments, to model a dynamic graph at a specific time $\vec{t}$, each unique pair of nodes and their connecting edge in the graph may be modeled using a characteristic function (e.g., using EQUATION (2)). A BDD modeling the dynamic graph may be a combination of all the characteristic functions modeling all unique pairs of nodes in the graph (e.g., by logically "OR'ing" them together).

When $\vec{a}$, $\vec{b}$, and $\vec{t}$ are each expressed in binary form, it may take any number of binary digits (i.e., bits) to represent each of $\vec{a}$, $\vec{b}$, and $\vec{t}$. For example, $\vec{a}$, $\vec{b}$, and $\vec{t}$ may each be represented using 32 bits. Thus, $\vec{a} = (a_{31}, \ldots, a_0)$, where $a_i \in \{0,1\}$. Similarly, $\vec{b} = (b_{31}, \ldots, b_0)$, where $b_i \in \{0,1\}$; and $\vec{t} = (t_{31}, \ldots, t_0)$ where $t_i \in \{0,1\}$. In this case, the characteristic function g has a total of 96 variables. Note that it is not necessary for the Node IDs and the time be represented using the same number of bits. With some implementations, given two nodes in a dynamic graph, a corresponds to the node with the smaller Node ID and $\vec{b}$ corresponds to the node with the larger Node ID. Alternatively, with some implementations, $\vec{a}$ corresponds to the node with the larger Node ID and $\vec{b}$ corresponds to the node with the smaller Node ID.

As described above, in a dynamic graph, a new edge connecting two nodes may become alive only after a specific time or an existing edge connecting two nodes may go away after a specific time. In addition, an edge connecting two nodes may exist only within a specific time period. Once a dynamic graph has been modeled with a BDD at a specific time, subsequently, new edges may be added to the graph as they become alive or existing edges may be deleted from the graph as they go away at various specific times.

In particular embodiments, a threshold function TH in terms of time may be defined as:

$$TH_{val}(\vec{t}) = 1_{if}[\vec{t}] \geq [val]. \tag{3}$$

In EQUATION (3), again, $\vec{t}$ denotes a specific time along the timeline, and val denotes a value. The threshold function TH evaluates to 1 if and only if $\vec{t}$ is greater than or equal to val. Otherwise, the threshold function TH evaluates to 0. For example, if val=9, then TH=1 when $\vec{t} \geq 9$ and TH=0 when $\vec{t} < 9$.

In particular embodiments, to add an edge connecting two nodes A and B that exists at a specific time $t_i$ to the graph (i.e., the edge connecting nodes A and B becomes alive at time $t_i$):

$$fla(\vec{t};\vec{a};\vec{b}) = TH_{t_i}(\vec{t}) \cdot f_{\{A\}}(\vec{a}) \cdot f_{\{B\}}(\vec{b}). \tag{4}$$

In EQUATION (4), the dot operator is a logical AND operator. To delete an edge connecting two nodes A and B that no longer exists at a specific time $t_i$ from the graph (i.e., the edge connecting nodes A and B goes away at time $t_i$):

$$fla(\vec{t};\vec{a};\vec{b})\&=\overline{TH_{t_i}(\vec{t})}\cdot f_{\{A\}}(\vec{a})\cdot f_{\{B\}}(\vec{b}). \quad (5)$$

In EQUATION (5), a bar over an expression is a logical NOT operator. To add an edge connecting two nodes A and B that exists between a specific time period (i.e., the edge connecting nodes A and B is alive only between the time period $[t_i,t_j]$):

$$fla(\vec{t};\vec{a};\vec{b})\&=\overline{TH_{t_{j+1}}(\vec{t})}\cdot f_{\{A\}}(\vec{a})\cdot f_{\{B\}}(\vec{b}). \quad (6)$$

in EQUATIONS (4) and (5) and (6), A and B denote two Node ID values, respectively; and $fla(\vec{t};\vec{a};\vec{b})$ models a pair of nodes and the edge connecting them at a specific time.

Figure 3:
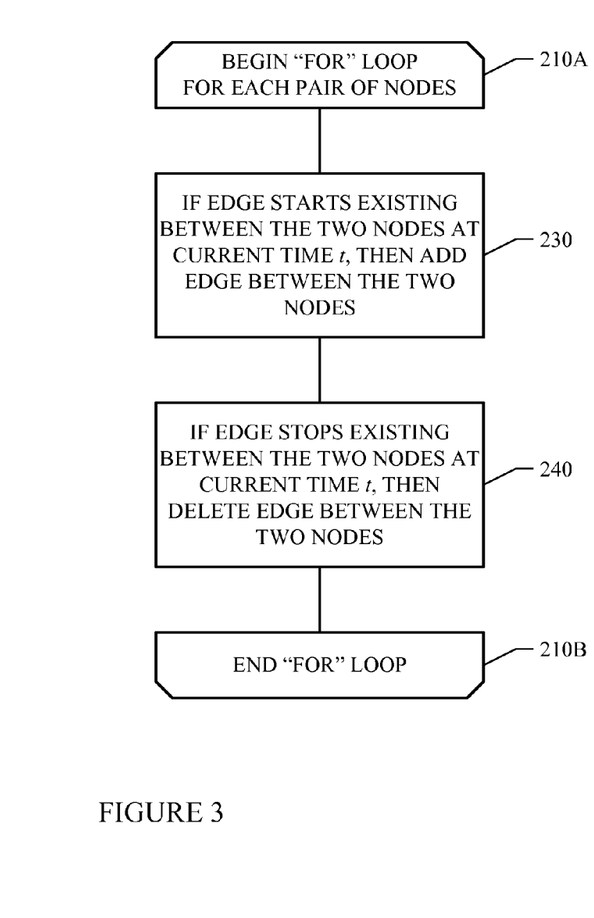
FIG. 3 illustrates example method for modeling dynamic graphs with Binary Decision Diagrams (BDDs).

FIG. 3 illustrates an example method for modeling a dynamic graph with a BDD. In particular embodiments, the process may include a loop that begins at 210A and ends at 210B. During each iteration of the loop, a pair of nodes in the graph may be processed. Thus, for a pair of nodes in the graph, at 230, if an edge connecting the two nodes becomes alive at the current time t, then the edge may be added (e.g., using EQUATION (4)). On the other hand, at 240, if an edge connecting the two nodes goes away at the current time t, then the edge may be deleted (e.g., using EQUATION (5)).

Once the BDD has been constructed, to query the BDD for edges in the dynamic graph that are alive or in existence at a specific time $t_i$, the BDD may be logically AND'ed with $TH_{t_i}(\vec{t})$. To query the BDD for edges in the dynamic graph that are alive or in existence within a specific time period $[t_i,t_j]$, the BDD may be logically AND'ed with $\overline{TH_{t_i}(\vec{t})}\cdot TH_{t_{j+1}}(\vec{t})$.

Using BDDs to model dynamic graphs have many advantages. As an example, BDD memory footprint is often much more compact (e.g., more than 10× compact) compared to explicit representations. Consequently, an entire dynamic graph may be stored in memory as a whole when modeled with a BDD. The graph is "compressed" while maintaining random access. As another example, elementary operations with the graph, such as adding and deleting edges, are efficient as both characteristic functions of single element sets and threshold functions correspond to path BDDs. As a third example, traversing the time variables $\vec{t}$ of $fla$ for a particular time instance $t_i$ leads to a BDD node that corresponds to the valid graph for $t_i$. Furthermore, sub-graphs for $t_i$ and $t_j$ correspond to the same sub-BDD if no edge update has been applied between $t_i$ and $t_j$. Depth-first traversal from a sub-BDD yields all stored edges.

The following pseudo code further illustrates how a threshold function may be created or constructed. Such a threshold function may then be used for querying a BDD that, for example, models a dynamic graph for all the edges that are alive at a specific time value (i.e., constructing a BDD for $TH_{value}(\vec{t})$):

---

```
BDD result = BDD_1
int bits = length of vector t⃗
while bits do {
    bits--
    if value % 2 then
        result &= NODE(var=bits, BDD_1, BDD_0)
    else if result != BDD_1 then
        result |= NODE(var=bits, BDD_1, BDD_0)
    value /= 2
}
```

---

Figure 4:
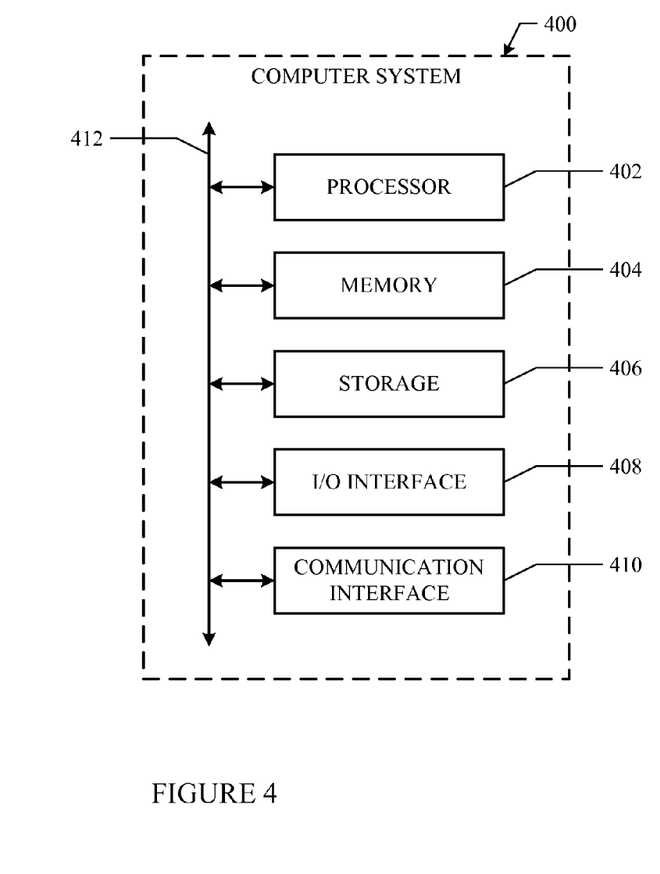
FIG. 4 illustrates an example computing device.

In particular embodiments, the process of modeling dynamic graphs with BDDs may be implemented as computer software stored in non-transitory memory and executed on computing devices. FIG. 4 illustrates an example computing system 400, which may be suitable for executing the software. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive ("HDD"), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate. This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A method, performed by a computing device, comprising:

modeling a dynamic graph having a plurality of nodes with a Binary Decision Diagram (BDD), by modeling each pair of nodes in the dynamic graph using a characteristic function, $g(\vec{t}; \vec{a}; \vec{b})$, where: $\vec{t}$ denotes a time; $\vec{a}$ denotes a first node identifier; $\vec{b}$ denotes a second node identifier; and g evaluates to 1 if and only if an edge exists and connects nodes $\vec{a}$ and $\vec{b}$ at time $\vec{t}$; and querying the BDD for edges in the dynamic graph that exist between a time $t_i$ and a time $t_j$ by applying a logical AND operation to the BDD and $TH_{t_i}(\vec{t}) \cdot TH_{t_{j+1}}(\vec{t})$, where:

$TH_{t_i}(\vec{t}) = 1 \text{ iff } [\vec{t}] \geq t_i$; and $TH_{t_j}(\vec{t}) = 1 \text{ iff } [\vec{t}] \geq t_j$.

2. The method of claim 1, further comprising combining all characteristic functions modeling all unique pairs of nodes in the dynamic graph by applying logical OR operations to the characteristic functions.

3. The method of claim 1, further comprising adding an edge to the dynamic graph between a node A and a node B that exists at a time $t_i$ by applying a logical OR operation to the BDD and $TH_{t_i}(\vec{t}) \cdot f_{\{A\}}(\vec{a}) \cdot f_{\{B\}}(\vec{b})$, where $TH_{t_i}(\vec{t}) = 1 \text{ iff } [\vec{t}] \geq t_i$;

$f_A(\vec{a}) = 1 \text{ iff } [\vec{a}] \in A$; and $f_B(\vec{b}) = 1 \text{ iff } [\vec{b}] \in B$.

4. The method of claim 1, further comprising
deleting an edge from the dynamic graph between a node A and a node B that does not exist at a time $t_i$ by applying a logical AND operation to the BDD and $TH_{t_i}(\vec{t}) \cdot f_{\{A\}}(\vec{a}) \cdot f_{\{B\}}(\vec{b})$, where:

$TH_{t_i}(\vec{t}) = 1 \text{ iff } [\vec{t}] \geq t_i;$ $f_A(\vec{a}) = 1 \text{ iff } [\vec{a}] \in A;$ and $f_B(\vec{b}) = 1 \text{ iff } [\vec{b}] \in B.$ 5. The method of claim 1, further comprising
adding an edge to the dynamic graph between a node A and a node B that exists between a time $t_i$ and a time $t_j$ by applying a logical OR operation to the BDD and $TH_{t_i}(\vec{t}) \cdot TH_{t_{j+1}}(\vec{t}) \cdot f_{\{A\}}(\vec{a}) \cdot f_{\{B\}}(\vec{b})$, where:

$TH_{t_i}(\vec{t}) = 1 \text{ iff } [\vec{t}] \geq t_i;$ $TH_{t_j}(\vec{t}) = 1 \text{ iff } [\vec{t}] \geq t_j;$ $f_A(\vec{a}) = 1 \text{ iff } [\vec{a}] \in A;$ and $f_B(\vec{b}) = 1 \text{ iff } [\vec{b}] \in B.$ 6. The method of claim 1, further comprising
querying the BDD for edges in the dynamic graph that exist at a time $t_i$ by applying a logical AND operation to the BDD and $TH_{t_i}(\vec{t})$, where:

$TH_{t_i}(\vec{t}) = 1 \text{ iff } [\vec{t}] \geq t_i.$

7. A system comprising:
a memory comprising instructions executable by one or more processors; and
the one or more processors coupled to the memory and operable to execute the instructions, the instructions causing the one or more processors to perform:
modeling a dynamic graph having a plurality of nodes with a Binary Decision Diagram (BDD), by modeling each pair of nodes in the dynamic graph using a characteristic function, $g(\vec{t}; \vec{a}; \vec{b})$ where: $\vec{t}$ denotes a time; $\vec{a}$ denotes a first node identifier; $\vec{b}$ denotes a second node identifier; and g evaluates to 1 if and only if an edge exists and connects nodes $\vec{a}$ and $\vec{b}$ at time $\vec{t}$; and
querying the BDD for edges in the dynamic graph that exist between a time $t_i$ and a time $t_j$ by applying a logical AND operation to the BDD and $TH_{t_i}(\vec{t}) \cdot TH_{t_{j+1}}(\vec{t})$, where:

$TH_{t_i}(\vec{t}) = 1 \text{ iff } [\vec{t}] \geq t_i;$ and $TH_{t_j}(\vec{t}) = 1 \text{ iff } [\vec{t}] \geq t_j.$ 8. The system of claim 7, wherein the instructions further causing the one or more processors to perform
combining all characteristic functions modeling all unique pairs of nodes in the dynamic graph by applying logical OR operations to the characteristic functions.

9. The system of claim 7, wherein the instructions further causing the one or more processors to perform
adding an edge to the dynamic graph between a node A and a node B that exists at a time $t_i$ by applying a logical OR operation to the BDD and $TH_{t_i}(\vec{t}) \cdot f_{\{A\}}(\vec{a}) \cdot f_{\{B\}}(\vec{b})$, where $TH_{t_i}(\vec{t}) = 1 \text{ iff } [\vec{t}] \geq t_i;$ $f_A(\vec{a}) = 1 \text{ iff } [\vec{a}] \in A;$ and $f_B(\vec{b}) = 1 \text{ iff } [\vec{b}] \in B.$ 10. The system of claim 7, wherein the instructions further causing the one or more processors to perform
deleting an edge from the dynamic graph between a node A and a node B that does not exist at a time $t_i$ by applying a logical AND operation to the BDD and $TH_{t_i}(\vec{t}) \cdot f_{\{A\}}(\vec{a}) \cdot f_{\{B\}}(\vec{b})$, where $TH_{t_i}(\vec{t}) = 1 \text{ iff } [\vec{t}] \geq t_i;$ $f_A(\vec{a}) = 1 \text{ iff } [\vec{a}] \in A;$ and $f_B(\vec{b}) = 1 \text{ iff } [\vec{b}] \in B.$ 11. The system of claim 7, wherein the instructions further causing the one or more processors to perform
adding an edge to the dynamic graph between a node A and a node B that exists between a time $t_i$ and a time $t_j$ by applying a logical OR operation to the BDD and $TH_{t_i}(\vec{t}) \cdot TH_{t_{j+1}}(\vec{t}) \cdot f_{\{A\}}(\vec{a}) \cdot f_{\{B\}}(\vec{b})$, where $TH_{t_i}(\vec{t}) = 1 \text{ iff } [\vec{t}] \geq t_i;$ $TH_{t_j}(\vec{t}) = 1 \text{ iff } [\vec{t}] \geq t_j;$ $f_A(\vec{a}) = 1 \text{ iff } [\vec{a}] \in A;$ and $f_B(\vec{b}) = 1 \text{ iff } [\vec{b}] \in B.$ 12. The system of claim 7, wherein the instructions further causing the one or more processors to perform
querying the BDD for edges in the dynamic graph that exist at a time $t_i$ by applying logical AND operation to the BDD and $TH_{t_i}(\vec{t})$, where:

$TH_{t_i}(\vec{t}) = 1 \text{ iff } [\vec{t}] \geq t_i.$

13. One or more computer-readable non-transitory storage media embodying logic that is operable when executed for:
modeling a dynamic graph having a plurality of nodes with a Binary Decision Diagram (BDD), by modeling each pair of nodes in the dynamic graph using a characteristic function, $g(\vec{t}; \vec{a}; \vec{b})$ where: $\vec{t}$ denotes a time; $\vec{a}$ denotes a first node identifier; $\vec{b}$ denotes a second node identifier; and g evaluates to 1 if and only if an edge exists and connects nodes $\vec{a}$ and $\vec{b}$ at time $\vec{t}$; and
querying the BDD for edges in the dynamic graph that exist between a time $t_i$ and a time $t_j$ by applying a logical AND operation to the BDD and $TH_{t_i}(\vec{t}) \cdot TH_{t_{j+1}}(\vec{t})$, where:

$TH_{t_i}(\vec{t}) = 1 \text{ iff } [\vec{t}] \geq t_i;$ and $TH_{t_j}(\vec{t}) = 1 \text{ iff } [\vec{t}] \geq t_j.$ 14. The media of claim 13, wherein the logic is further operable when executed for
combining all characteristic functions modeling all unique pairs of nodes in the dynamic graph by applying logical OR operations to the characteristic functions.

15. The media of claim 13, wherein the logic is further operable when executed for adding an edge to the dynamic graph between a node A and a node B that exists at a time $t_i$ by applying logical OR operation to the BDD and $TH_{t_i}(\vec{t}) \cdot f_{\{A\}}(\vec{a}) \cdot f_{\{B\}}(\vec{b})$, where:

$TH_{t_i}(\vec{t}) = 1\ iff\ [\vec{t}] \geq t_i;$ $f_A(\vec{a}) = 1\ iff\ [\vec{a}] \in A;\ and$ $f_B(\vec{b}) = 1\ iff\ [\vec{b}] \in B.$ 16. The media of claim 13, wherein the logic is further operable when executed for
deleting an edge from the dynamic graph between a node A and a node B that does not exist at a time $t_i$ by applying a logical AND operation to the BDD and $\overline{TH_{t_i}(\vec{t})} \cdot f_{\{A\}}(\vec{a}) \cdot f_{\{B\}}(\vec{b})$, where:

$TH_{t_i}(\vec{t}) = 1\ iff\ [\vec{t}] \geq t_i;$ $f_A(\vec{a}) = 1\ iff\ [\vec{a}] \in A;\ and$ $f_B(\vec{b}) = 1\ iff\ [\vec{b}] \in B.$ 17. The media of claim 13, wherein the logic is further operable when executed for
adding an edge to the dynamic graph between a node A and a node B that exists between a time $t_i$ and a time $t_j$ by applying a logical OR operation to the BDD and $TH_{t_i}(\vec{t}) \cdot \overline{TH_{t_{j+1}}(\vec{t})} \cdot f_{\{A\}}(\vec{a}) \cdot f_{\{B\}}(\vec{b})$, where $TH_{t_i}(\vec{t}) = 1\ iff\ [\vec{t}] \geq t_i;$ $TH_{t_j}(\vec{t}) = 1\ iff\ [\vec{t}] \geq t_j;$ $f_A(\vec{a}) = 1\ iff\ [\vec{a}] \in A;\ and$ $f_B(\vec{b}) = 1\ iff\ [\vec{b}] \in B.$ 18. The media of claim 15, wherein the logic is further operable when executed for
querying the BDD for edges in the dynamic graph that exist at a time $t_i$ by applying a logical AND operation to the BDD and $TH_{t_i}(t)$, where:

$TH_{t_i}(\vec{t}) = 1\ iff\ [\vec{t}] \geq t_i.$

* * * * *

UNITED STATES PATENT AND TRADEMARK OFFICE
CERTIFICATE OF CORRECTION

| | | |
|---|---|---|
| PATENT NO. | : 8,983,893 B2 | Page 1 of 1 |
| APPLICATION NO. | : 13/569618 | |
| DATED | : March 17, 2015 | |
| INVENTOR(S) | : Stergios Stergiou | |

It is certified that error appears in the above-identified patent and that said Letters Patent is hereby corrected as shown below:

In the claims:

Column 14, Line 16: After "The media of claim" and before "wherein the logic" delete "15" and insert -- 13 --.

Signed and Sealed this
Twenty-third Day of June, 2015

Michelle K. Lee
*Director of the United States Patent and Trademark Office*